(12) United States Patent
Gossweiler, III et al.

(10) Patent No.: US 8,902,714 B2
(45) Date of Patent: *Dec. 2, 2014

(54) SMART-WATCH INCLUDING FLIP UP DISPLAY

(71) Applicant: Google Inc., Mountain View, CA (US)

(72) Inventors: Richard Carl Gossweiler, III, Sunnyvale, CA (US); James Brooks Miller, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,410

(22) Filed: Feb. 19, 2013

(65) Prior Publication Data

US 2013/0163390 A1 Jun. 27, 2013

Related U.S. Application Data

(63) Continuation of application No. 13/590,456, filed on Aug. 21, 2012, now Pat. No. 8,379,488, which is a continuation of application No. 13/281,819, filed on Oct. 26, 2011, now Pat. No. 8,279,716.

(51) Int. Cl.
*G04B 47/00* (2006.01)
(Continued)

(52) U.S. Cl.
CPC ........... *G04G 21/04* (2013.01); *G04B 47/06* (2013.01); *G04G 17/083* (2013.01); *H04B 1/385* (2013.01); *H04M 1/72552* (2013.01); *G04B 47/00* (2013.01); *H04M 2250/60* (2013.01); *G04G 21/08* (2013.01)
USPC ............ 368/10; 368/13; 368/282; 379/433.1; 382/100; 382/103; 455/414.2; 455/556.1; 455/556; 455/575.3

(58) Field of Classification Search
USPC .......................... 368/4, 10, 13, 278, 281, 282; 348/14.02, 211.2; 379/43.01, 433.04, 379/433.1, 433.13; 382/100, 103; 455/414.2, 556.1, 566, 575.3
See application file for complete search history.

(56) References Cited

U.S. PATENT DOCUMENTS 4,130,987 A  12/1978 Schickedanz
4,141,074 A  2/1979 Popper
(Continued)

FOREIGN PATENT DOCUMENTS

EP   0602828   6/1994
WO   93/16448   8/1993

OTHER PUBLICATIONS

International Search Report in Application No. PCT/US2012/061470, mailed Mar. 18, 2013.
(Continued)

*Primary Examiner* — Vit W Miska
(74) *Attorney, Agent, or Firm* — Morris & Kamlay LLP

(57) ABSTRACT

A smart-watch can include a wristband, a base, and a flip up portion. The base can be coupled to the wristband and include a housing, a processor, a wireless transceiver, and a tactile user interface. The wireless transceiver can be configured to connect to a wireless network. The tactile user interface can be configured to provide interaction between a user and the smart-watch. The flip up portion can be displaceable between an open position exposing the base and a closed position concealing the base. Further, the flip up portion can include: a top display exposed when the flip up portion is in the closed position, and an inside display opposite the top display. The inside display can be concealed when the flip up portion is in the closed position and be exposed when the flip up portion is in the open position.

19 Claims, 5 Drawing Sheets

(51) Int. Cl.
*G04B 47/02* (2006.01)
*H04M 9/00* (2006.01)
*H04M 3/42* (2006.01)
*H04M 1/00* (2006.01)
*G04B 47/06* (2006.01)
*G04G 17/08* (2006.01)
*H04B 1/38* (2006.01)
*G04G 21/04* (2013.01)
*H04M 1/725* (2006.01)
*G04G 21/08* (2010.01)

(56) References Cited

U.S. PATENT DOCUMENTS

| | | |
|---|---|---|
| 4,236,239 A | 11/1980 | Imgruth et al. |
| 4,255,801 A | 3/1981 | Ode et al. |
| 4,403,869 A | 9/1983 | Crutcher |
| 4,412,751 A | 11/1983 | Jeannet et al. |
| 4,419,770 A | 12/1983 | Yagi et al. |
| 4,586,827 A | 5/1986 | Hirsch et al. |
| 4,800,543 A | 1/1989 | Lyndon-James et al. |
| 4,817,065 A | 3/1989 | Usui et al. |
| 5,020,039 A | 5/1991 | Yokote |
| 5,050,138 A | 9/1991 | Yamada et al. |
| 5,077,710 A | 12/1991 | Gogniat |
| 5,081,852 A | 1/1992 | Cox |
| 5,138,590 A | 8/1992 | Masuda et al. |
| 5,251,189 A | 10/1993 | Thorp |
| 5,274,613 A | 12/1993 | Seager |
| 5,280,296 A | 1/1994 | Tan et al. |
| 5,416,730 A | 5/1995 | Lookofsky |
| 5,499,398 A | 3/1996 | Kudoh et al. |
| 5,615,179 A | 3/1997 | Yamamoto et al. |
| 5,872,744 A | 2/1999 | Taylor |
| 5,889,737 A | 3/1999 | Alameh et al. |
| 6,035,035 A | 3/2000 | Firooz |
| 6,158,884 A | 12/2000 | Lebby et al. |
| 6,192,253 B1 | 2/2001 | Charlier et al. |
| 6,212,414 B1 | 4/2001 | Alameh et al. |
| 6,285,757 B1 | 9/2001 | Carroll et al. |
| 6,359,837 B1 | 3/2002 | Tsukamoto |
| 6,408,072 B1 | 6/2002 | Fernandez-Martinez |
| 6,430,110 B2 | 8/2002 | Baroche |
| 6,529,713 B1 | 3/2003 | Seymour |
| 6,567,122 B1 | 5/2003 | Anderson et al. |
| 6,590,835 B2 | 7/2003 | Farine et al. |
| 6,618,328 B1 | 9/2003 | Ellner et al. |
| 6,619,835 B2 | 9/2003 | Kita |
| 6,619,836 B1 | 9/2003 | Silvant et al. |
| 6,681,014 B1 | 1/2004 | Ghassabian |
| 6,863,539 B2 | 3/2005 | Marmaropoulos |
| 6,873,575 B2 | 3/2005 | Yamazaki et al. |
| 6,874,931 B2 | 4/2005 | Noirjean et al. |
| 6,960,016 B2 | 11/2005 | Apotheloz et al. |
| 7,016,532 B2 | 3/2006 | Boncyk et al. |
| 7,126,626 B2 | 10/2006 | Sawahara et al. |
| 7,234,010 B2 | 6/2007 | Gilmour |
| 7,280,711 B2 | 10/2007 | Yoshida et al. |
| 7,345,954 B2 | 3/2008 | Ehrsam et al. |
| 7,398,151 B1 | 7/2008 | Burrell et al. |
| 7,441,415 B2 | 10/2008 | Radley-Smith |
| 7,450,107 B2 | 11/2008 | Radley-Smith |
| 7,453,936 B2 | 11/2008 | Kondo |
| 7,463,205 B2 | 12/2008 | Turner et al. |
| 7,477,780 B2 | 1/2009 | Boncyk et al. |
| 7,513,019 B2 | 4/2009 | Friedman et al. |
| 7,616,261 B2 * | 11/2009 | Kitamura et al. ............. 348/552 |
| 7,618,260 B2 | 11/2009 | Daniel et al. |
| 7,680,324 B2 | 3/2010 | Boncyk et al. |
| 7,751,805 B2 | 7/2010 | Neven et al. |
| 7,817,863 B2 | 10/2010 | Kondo |
| 7,841,209 B2 | 11/2010 | Radley-Smith |
| 7,849,620 B2 | 12/2010 | Hussey et al. |
| 7,899,252 B2 | 3/2011 | Boncyk et al. |
| 8,014,635 B2 | 9/2011 | Kondo |
| 8,059,491 B1 | 11/2011 | Hennings-Kampa |
| 2001/0011025 A1 | 8/2001 | Ohki et al. |
| 2001/0017663 A1 | 8/2001 | Yamaguchi et al. |
| 2002/0021622 A1 | 2/2002 | Baroche |
| 2002/0077145 A1 * | 6/2002 | Kamiya et al. ............... 455/550 |
| 2002/0101349 A1 | 8/2002 | Rojas |
| 2002/0102966 A1 | 8/2002 | Lev et al. |
| 2002/0140988 A1 | 10/2002 | Cheatle et al. |
| 2002/0142810 A1 * | 10/2002 | Kawasaki et al. ............ 455/566 |
| 2003/0019894 A1 | 1/2003 | Caldana |
| 2003/0030595 A1 | 2/2003 | Radley-Smith |
| 2003/0039174 A1 | 2/2003 | Magnusson |
| 2003/0112217 A1 * | 6/2003 | Lee ............................... 345/102 |
| 2003/0123329 A1 | 7/2003 | Guanter et al. |
| 2003/0133515 A1 | 7/2003 | Kondo |
| 2004/0048633 A1 | 3/2004 | Sato et al. |
| 2004/0151071 A1 | 8/2004 | Kocher |
| 2004/0208372 A1 | 10/2004 | Boncyk et al. |
| 2005/0162523 A1 | 7/2005 | Darrell et al. |
| 2005/0185060 A1 * | 8/2005 | Neven ........................ 348/211.2 |
| 2005/0252966 A1 * | 11/2005 | Kulas ............................. 235/383 |
| 2005/0265125 A1 | 12/2005 | Yoshida et al. |
| 2006/0002607 A1 | 1/2006 | Boncyk et al. |
| 2006/0044828 A1 * | 3/2006 | Kim et al. ..................... 362/613 |
| 2006/0155466 A1 * | 7/2006 | Kanda et al. .................. 701/209 |
| 2006/0262952 A1 | 11/2006 | Wagner et al. |
| 2007/0064542 A1 | 3/2007 | Fukushima |
| 2007/0242771 A1 | 10/2007 | Kondo |
| 2007/0246494 A1 | 10/2007 | Kim et al. |
| 2007/0270187 A1 | 11/2007 | Haneda |
| 2008/0037375 A1 | 2/2008 | Ellner et al. |
| 2008/0318636 A1 | 12/2008 | Kim |
| 2009/0009470 A1 | 1/2009 | Choi et al. |
| 2009/0048001 A1 | 2/2009 | Mihara et al. |
| 2009/0061958 A1 | 3/2009 | Osgood |
| 2009/0069045 A1 | 3/2009 | Cheng |
| 2009/0102859 A1 * | 4/2009 | Athsani et al. ................ 345/619 |
| 2009/0195350 A1 | 8/2009 | Tsern et al. |
| 2009/0219788 A1 | 9/2009 | Henley, Jr. |
| 2009/0231960 A1 | 9/2009 | Hutcheson |
| 2010/0034468 A1 | 2/2010 | Boncyk et al. |
| 2010/0035637 A1 * | 2/2010 | Varanasi et al. .............. 455/457 |
| 2010/0131195 A1 | 5/2010 | Jung et al. |
| 2010/0219943 A1 | 9/2010 | Vanska et al. |
| 2011/0003665 A1 | 1/2011 | Burton et al. |
| 2011/0012796 A1 | 1/2011 | Kim et al. |
| 2011/0059771 A1 | 3/2011 | Kondo |
| 2011/0127325 A1 | 6/2011 | Hussey et al. |
| 2011/0139868 A1 | 6/2011 | Baker |
| 2011/0150292 A1 | 6/2011 | Boncyk et al. |
| 2011/0205851 A1 | 8/2011 | Harris |
| 2011/0295829 A1 | 12/2011 | Boncyk et al. |
| 2012/0030043 A1 | 2/2012 | Ross et al. |

OTHER PUBLICATIONS

Office Action dated Mar. 1, 2012 regarding U.S. Appl. No. 13/281,851, 15 pages.

* cited by examiner

SMART-WATCH INCLUDING FLIP UP DISPLAY

CROSS-REFERENCE TO RELATED APPLICATIONS

This application is a continuation of U.S. patent application Ser. No. 13/590,456, filed Aug. 21, 2012, which is a continuation of U.S. patent application Ser. No. 13/281,819, filed on Oct. 26, 2011, now U.S. Pat. No. 8,279,716, issued Oct. 2, 2012. The entire disclosure of each of the above applications is incorporated herein by reference.

FIELD

The present disclosure relates to display features included in a smart-watch.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A variety of portable user devices provide wireless network connectivity. Various features of a device often require a user to access the device at inconvenient times to perform a desired function. As a result, a user may simply not employ the device to its full capabilities.

SUMMARY

In various embodiments of the present disclosure, a smart-watch can include a wristband, a base, a flip up portion, and a camera. The base can be coupled to the wristband and include: a housing, a processor, a wireless transceiver in communication with the processor, and a tactile user interface in communication with the processor and coupled to the housing. The wireless transceiver can be configured to connect to a wireless network. Further, the tactile user interface can be configured to provide interaction between a user and the smart-watch. The flip up portion can be in communication with the processor and be coupled to the base. Further, the flip up portion can be displaceable between an open position exposing the base and a closed position concealing the base. The flip up portion can include: a top display exposed when the flip up portion is in the closed position, and an inside display opposite the top display. The inside display can be concealed when the flip up portion is in the closed position and exposed when the flip up portion is in the open position. The camera can be in communication with the processor and be coupled to one of the base and the flip up portion. The flip up portion can form a viewfinder for the camera when in the open position and be configured to display information regarding an image within the viewfinder.

In various embodiments of the present disclosure, a smart-watch can include a wristband, a base, and a flip up portion. The base can be coupled to the wristband and include: a housing, a processor, a wireless transceiver in communication with the processor, and a tactile user interface in communication with the processor. The wireless transceiver can be configured to connect to a wireless network. Further, the tactile user interface can be coupled to the housing and be configured to provide interaction between a user and the smart-watch. The flip up portion can be in communication with the processor and be coupled to the base. The flip up portion can be displaceable between an open position exposing the base and a closed position concealing the base. Further, the flip up portion can include: a top display exposed when the flip up portion is in the closed position, and an inside display opposite the top display. The inside display can be concealed when the flip up portion is in the closed position and be exposed when the flip up portion is in the open position.

In various embodiments of the present disclosure, a smart-watch can include a wristband, a base, a flip up portion, and a camera. The base can be coupled to the wristband and include: a housing, a processor, and a wireless transceiver in communication with the processor. The wireless transceiver can be configured to connect to a wireless network. The flip up portion can be in communication with the processor and be coupled to the base and displaceable between an open position and a closed position. The camera can be in communication with the processor and be coupled to one of the base and the flip up portion. The flip up portion can form a viewfinder for the camera when in the open position and be configured to display information regarding an image within the viewfinder.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
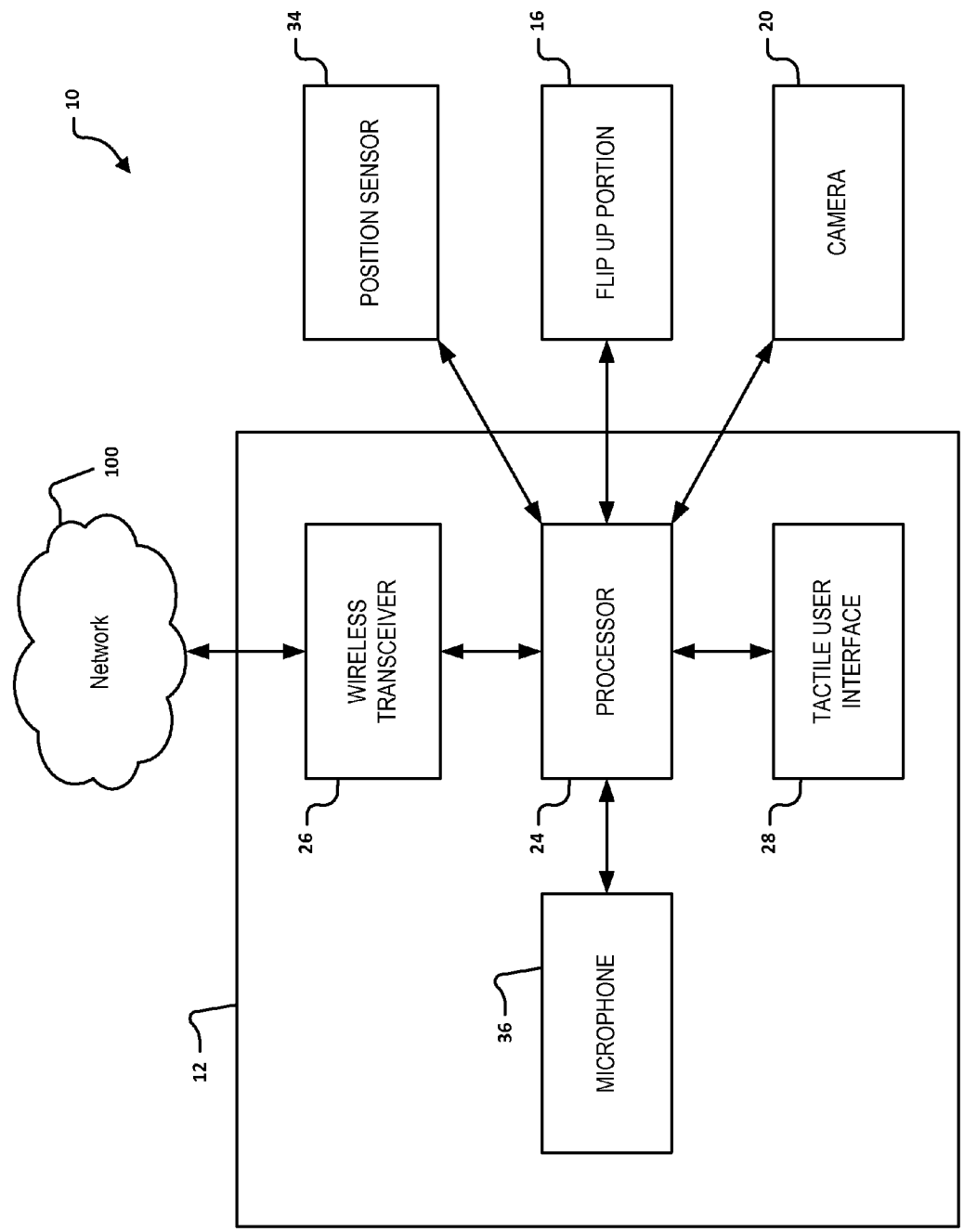
FIG. 1 is a schematic block diagram of an example smart-watch according to the present disclosure.
Figure 2:
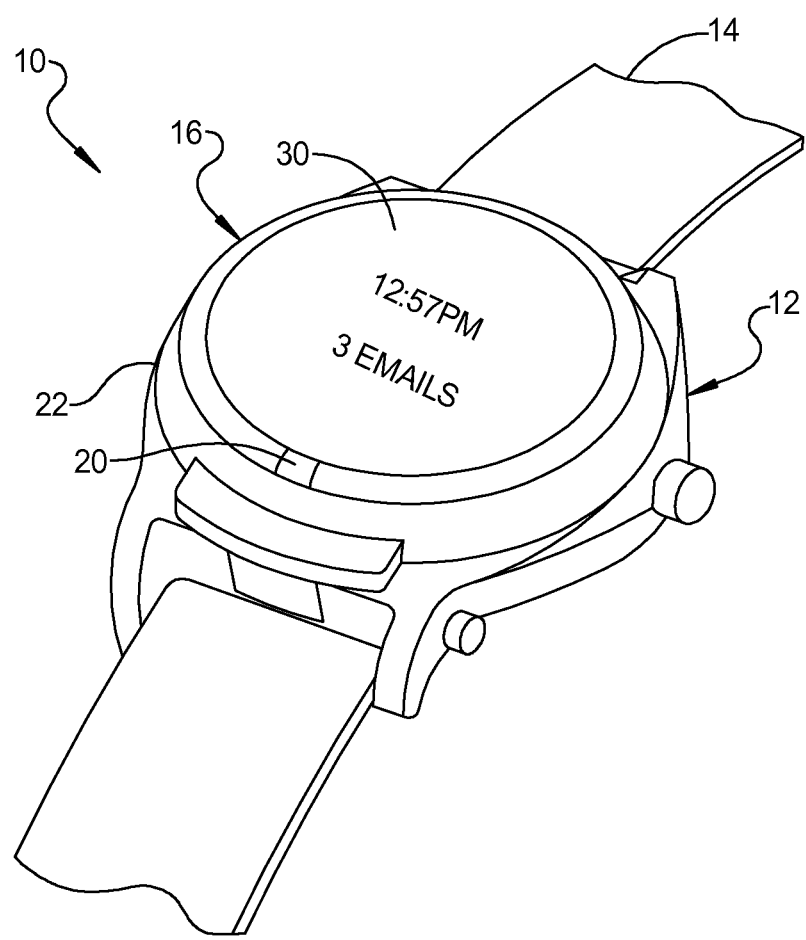
FIG. 2 is a perspective view of the smart-watch shown in FIG. 1 with a flip up portion in the closed position.
Figure 3:
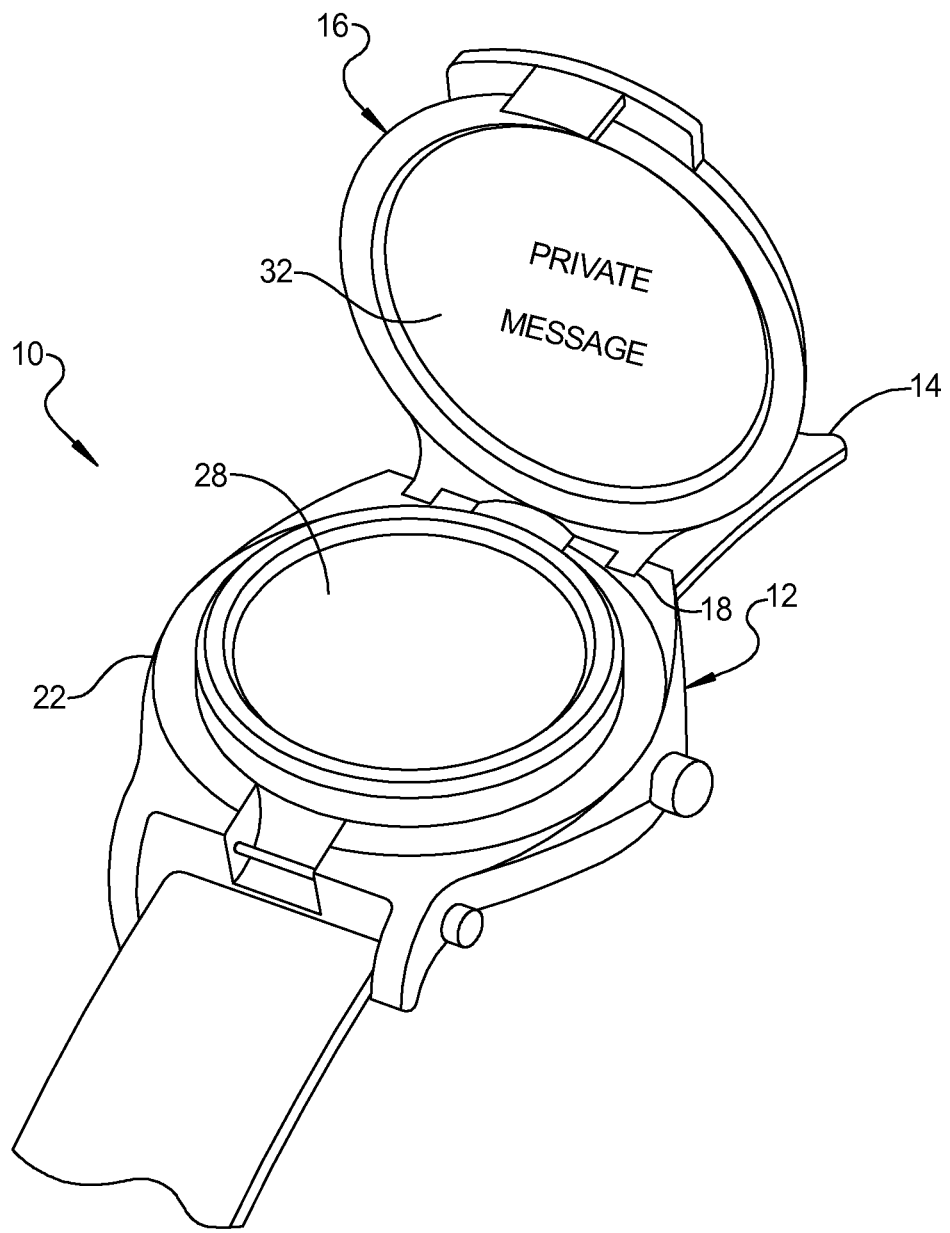
FIG. 3 is an additional perspective view of the smart-watch shown in FIG. 1 with the flip up portion in the open position.

Referring now to FIGS. 1-3, a smart-watch 10 is illustrated. The smart-watch 10 may include a base 12, a wristband 14 coupled to the base 12, a flip up portion 16, a hinge 18 coupled to the base 12 and the flip up portion 16, and a camera 20. The base 12 may include a housing 22, a processor 24 coupled to the housing 22, a wireless transceiver 26 coupled to the housing and in communication with the processor 24, and a tactile user interface 28 in communication with the processor 24 and coupled to the housing 22. The processor 24 may be in communication with the flip up portion 16 and the camera 20. The wireless transceiver 26 can provide a connection to a wireless network 100. Examples of the wireless network include, but are not limited to, the Internet, a wide area network, a local area network, a satellite network, a telecommunications network, a private network, and combinations of these.

The tactile user interface 28 provides interaction between a user and the smart-watch 10. The tactile user interface 28 may take a variety of forms including, but not limited to, a touchpad or a touchscreen. The flip up portion 16 may be displaceable between a closed position (FIG. 2) and an open position (FIG. 3). The base 12 may be partly or completely concealed when the flip up portion 16 is in the closed position and may be exposed when the flip up portion 16 is in the open position. The flip up portion 16 may include a top display 30 and an inside display 32 opposite the top display 30. The inclusion of a flip up portion 16 as the display for the smart-watch 10 provides a greater surface area for the tactile user interface 28 for user interaction with the smart-watch 10. The tactile user interface 28 may be large enough to track a user's finger for touchpad functions. By way of non-limiting example, the tactile user interface 28 may include a touchpad or a touchscreen display covering at least seventy-five percent of the lateral surface of the base 12.

The top display 30 may be exposed when the flip up portion 16 is in the closed position. The inside display 32 may be concealed when the flip up portion 16 is in the closed position and may be exposed when the flip up portion 16 is in the open position. The top and inside displays 30, 32 may take a variety of forms. By way of non-limiting example, the top display 30 and the inside display 32 may be two separate liquid crystal displays (LCDs). Alternatively, a single translucent LCD display may be used without backlighting with the outer surface forming the top display 30 and the inner surface forming the inside display 32. Further yet, smart glass may be used for the flip up portion 16 and the inside display 32 may be illuminated when the flip up portion 16 is open using a frosted display acting as a diffuser. Additional arrangements include use of ambient light or light emitting diodes (LEDs) on the edge of the flip up portion 16 for illumination and/or the use of organic LEDs (OLEDs).

The hinge 18 may include or may be engaged with a position sensor 34 that detects displacement of the flip up portion 16 relative to the base 12. The position sensor 34 may be in communication with the processor 24 and may sense when the flip up portion 16 is in the open position, the closed position and an intermediate partially open position. The inside display 32 may be powered off when the flip up portion 16 is in the closed position. The position sensor 34 may additionally control information displayed on the top display 30 and/or the inside display 32.

The top display 30 may display a first set of information and the inside display 32 may display a second set of information different from the first set of information. As seen in FIG. 2, the top display 30 may display information that is acceptable by the user for public viewing, such as the time, date and/or a number of e-mails in the user's inbox. As seen in FIG. 3, the inside display may display information that the user determines is private and not acceptable for public viewing such as an e-mail inbox and/or the body of an e-mail message. The inside display 32 may display a portion of the second set of information on an upper portion when the flip up portion 16 is in an intermediate position between the closed position and the open position. By way of non-limiting example, the intermediate position may include information regarding recent received messages.

The camera 20 may be coupled to the base 12 or the flip up portion 16. In the example shown in FIGS. 2 and 3, the camera 20 is located on the flip up portion 16. The processor 24 may activate the camera 20 when the flip up portion 16 is opened. The inside display 32 of the flip up portion 16 may form a partially transparent (or translucent) display in order to form an optical viewfinder for the camera 20. As discussed above, ambient light or LEDs on the edge of the inside display 32 may be used to illuminate the inside display 32 when the flip up portion 16 is in the open position. The inside display 32 may display additional information with the image included for the viewfinder function.

The image shown on the inside display 32 may be analyzed and information related to the image may be provided on the inside display 32 with the image. Information regarding the image may be provided by local real-time image scanning or may be sent to a computing device via the network for image analysis. As used in the present disclosure, a computing device may include one or more servers and/or processors. Two non-limiting examples of image analysis using the smart-watch 10 are discussed below.

Figure 4:
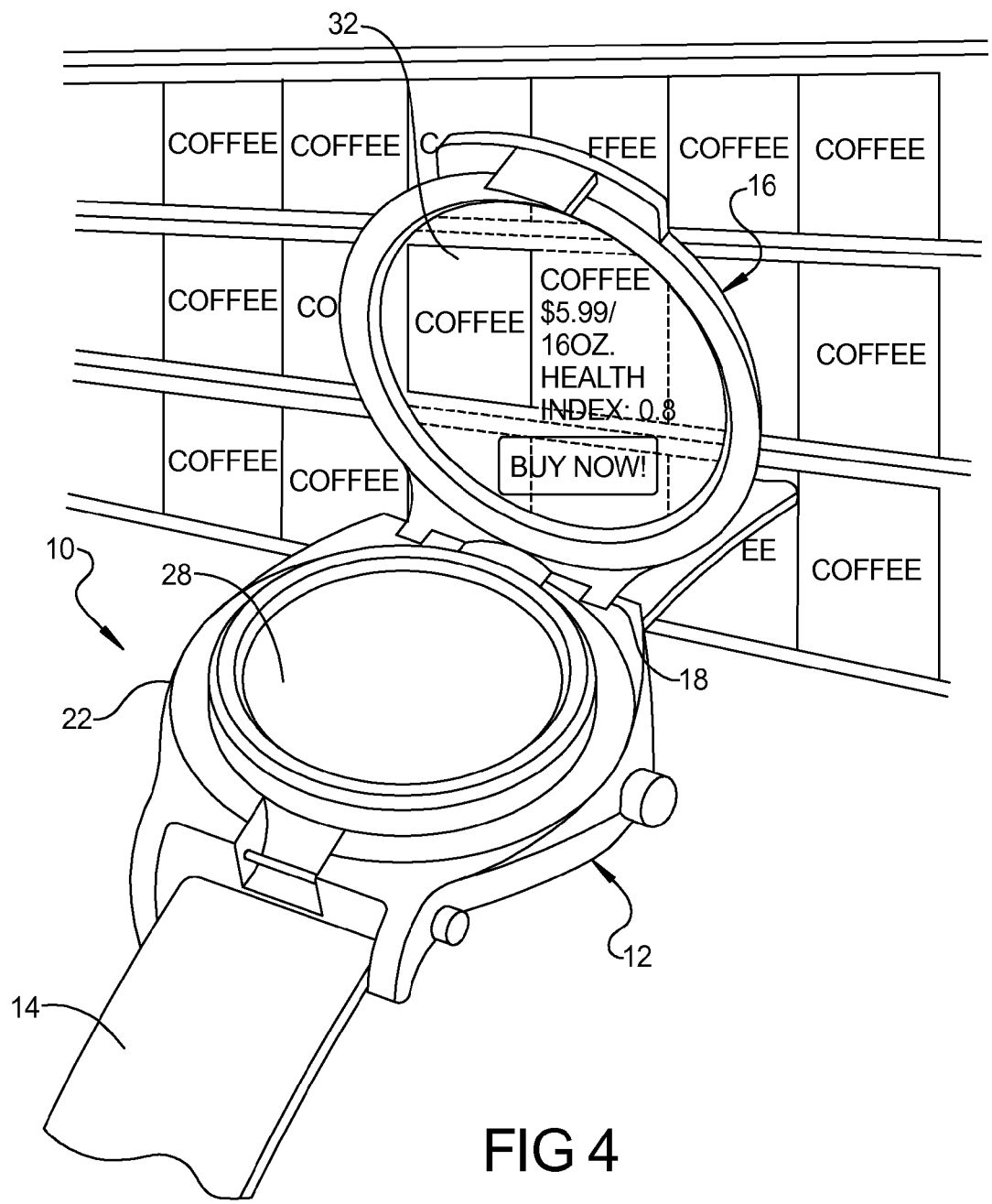
FIG. 4 is a perspective view of the smart-watch shown in FIG. 1 in a first application.

The first non-limiting example, seen in FIG. 4, includes an application where a user receives product information from the smart-watch 10. The user may open the flip up portion 16 and capture an image of the desired product on the camera 20. As discussed above, the inside display 32 of the flip up portion 16 may form an optical viewfinder for the camera 20. Therefore, the image may be seen on the inside display 32 by the user. Product information may be retrieved in a variety of ways including, but not limited to, bar code scanning of the product or image analysis of the product. In the arrangement using bar code scanning, the bar code of the product may be located within the optical viewfinder (inside display 32 of the flip up portion 16) and sent to a computing device via the network to retrieve information regarding the product. The information may then be displayed on the inside display 32.

In the arrangement using image analysis, the product image may be sent to a computing device via the network to identify the product and retrieve information regarding the product. The information may then be displayed on the inside display 32. In either of the arrangements discussed above for product identification, the top display 30 and the inside display 32 may be partially transparent to provide both viewing of the product image through the inside display 32 and the product information displayed on the inside display 32. Product information may include a variety of features including, but not limited to, nutritional information (health rating), whether the user has the product at home, coupons, other related advertisements or pricing information.

Figure 5:
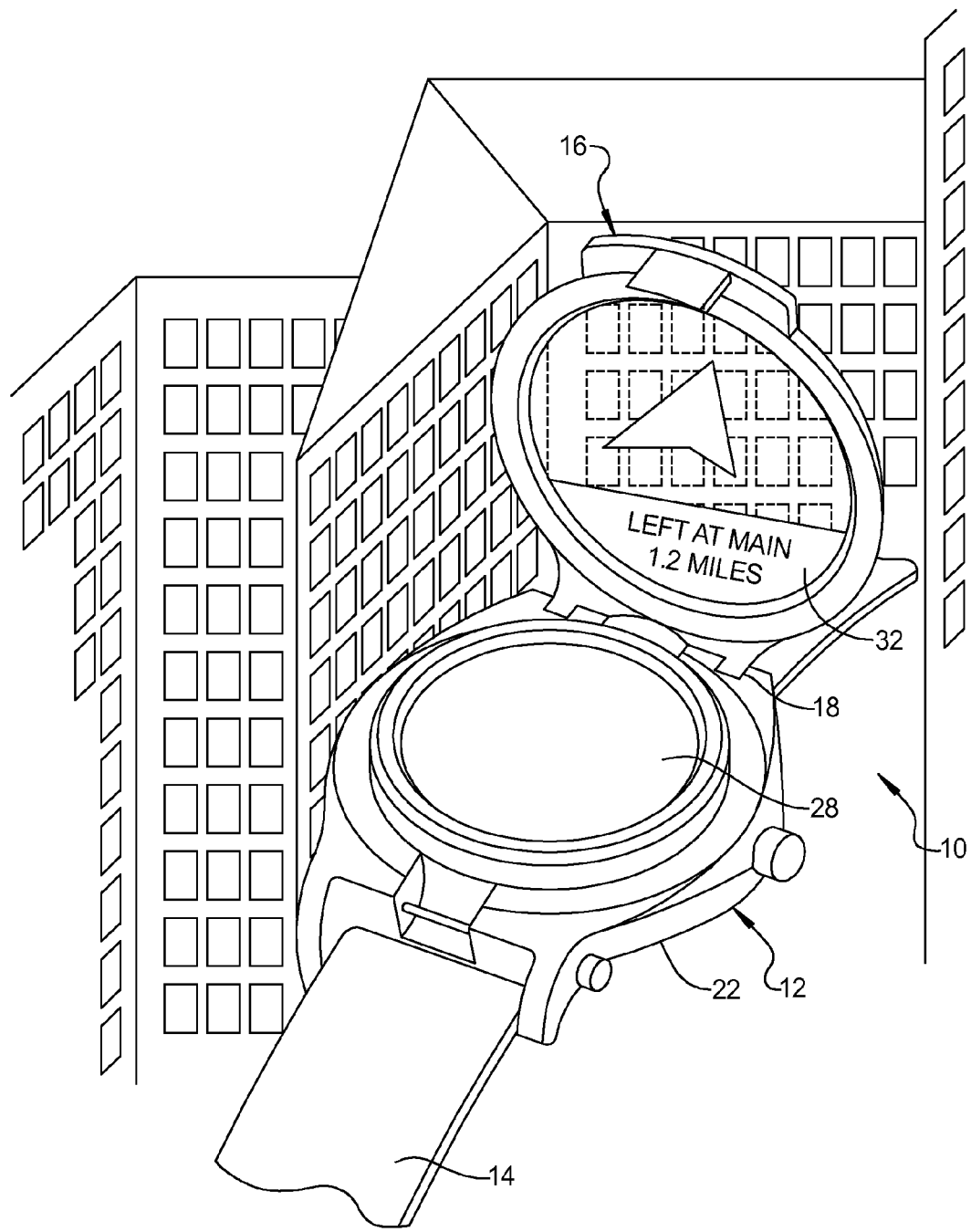
FIG. 5 is a perspective view of the smart-watch shown in FIG. 1 in a second application.

The second non-limiting example, seen in FIG. 5, includes an application where a user receives directional information from the smart-watch 10. The user may open the flip up portion 16 and provide a desired destination to the smart-watch in a variety of ways including, but not limited to, inputting the destination via a user interface defined on the base 12 or speaking the desired destination into a microphone 36 (FIG. 1) of the smart-watch 10 in communication with the processor 24. The spoken destination may be shown on the inside display 32. The smart-watch 10 may determine a current location of the user in a variety of ways including, but not limited to, an internal global positioning system (GPS) within the smart-watch 10, GPS from a cellular phone of the user, Wi-Fi triangulation using the wireless transceiver 26 or analysis of an image of the current location of the user captured by the camera 20.

The smart-watch 10 may then display directions to the desired destination on the inside display 32 or may provide audible directions. The directions may include turn-by-turn directions based on the view in the seen by the user in the optical viewfinder defined by the flip up portion 16 with a compass display and time and distance to the destination. In the arrangement where directions are included in the inside display 32, the top display 30 and the inside display 32 may be partially transparent to provide both viewing of the environment (street view) through the inside display 32 and directions displayed on the inside display 32. Audible directions may be provided in addition to the directions on the inside display 32. Alternatively, if audible directions are used in place of displaying directions on the inside display, the top display 30 and the inside display 32 may both be transparent while directions are provided to the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A smart-watch comprising:
a housing configured to connect a wristband;
at least one processor;
a wireless transceiver in communication with the at least one processor and configured to receive information wirelessly;
a user interface in communication with the at least one processor and configured to provide interaction between a user and the smart-watch;
a camera in communication with the at least one processor; and
a flip up portion in communication with the at least one processor, the flip up portion being displaceable between an open position and a closed position and including:
a top display exposed when the flip up portion is in the closed position, and
an inside display opposite the top display, the inside display being at least partially concealed when the flip up portion is in the closed position and being exposed when the flip up portion is in the open position,
wherein the flip up portion forms a viewfinder for the camera when in the open position and is configured to display information regarding an item visible within the viewfinder concurrently with an image of the item, while the image is visible within the viewfinder.

2. The smart-watch of claim 1, wherein the top display displays a first set of information for viewing and the inside display displays a second set of information, comprising the information regarding the item visible within the viewfinder, for viewing, different from the first set of information, the first set of information being considered acceptable for public viewing by a user.

3. The smart-watch of claim 2, wherein:
the second set of information is displayed on the inside display when the flip up portion is in the open position,
the inside display being in an off condition with the second set of information not being displayed when the flip up portion is in the closed position, and
the inside display displaying a portion of the second set of information when the flip up portion is in an intermediate position between the open position and the closed position.

4. The smart-watch of claim 1, wherein the additional information regarding the image is received from a computing device via the wireless transceiver.

5. The smart-watch of claim 1, wherein the top display and inside display comprise a translucent LCD having an outer surface and an inner surface, the outer surface forming the top display and the inner surface forming the inside display.

6. The smart-watch of claim 1, wherein the top display and inside display are formed of smart glass, wherein the inside display is illuminated when the flip up portion is in the open position with a frosted display acting as a diffuser.

7. The smart-watch of claim 1, wherein the flip up portion is at least partially transparent when in the open position to form the viewfinder.

8. The smart-watch of claim 1, wherein the user interface includes a touch screen display.

9. The smart-watch of claim 1, further comprising one or more light emitting diodes arranged on an edge of the inside display, the one or more light emitting diodes configured to illuminate the inside display when the flip up portion is in the open position.

10. A smart-watch comprising:
a housing configured to connect to a wristband;
at least one processor;
a wireless transceiver in communication with the at least one processor and configured to receive information wirelessly;
a camera in communication with the at least one processor; and
a flip up portion in communication with the at least one processor and displaceable between an open position and a closed position, the flip up portion forming a viewfinder for the camera when in the open position and configured to display information regarding an item visible within the viewfinder, the information including product information when the item is a product or including directional information when the item is a geographic location, wherein the flip up portion is at least partially transparent when in the open position to form the viewfinder.

11. The smart-watch of claim 10, wherein the information related to the image includes product information when a product is displayed in the viewfinder.

12. The smart-watch of claim 10, wherein the information related to the image includes directional information when a geographic location is displayed in the viewfinder.

13. The smart-watch of claim 12, wherein the flip up portion is at least partially transparent when in the open position to form the viewfinder and is configured to display the directional information and the geographic location simultaneously.

14. The smart-watch of claim 10, wherein the information regarding the image is received from a computing device via the wireless transceiver.

15. The smart-watch of claim 14, further comprising one or more light emitting diodes arranged on an edge of the inside display, the one or more light emitting diodes configured to illuminate the inside display when the flip up portion is in the open position.

16. A smart-watch comprising:
a housing configured to connect to a wristband;
at least one processor;
a wireless transceiver in communication with the at least one processor and configured to receive information wirelessly;
a camera in communication with the at least one processor; and a flip up portion in communication with the at least one processor and displaceable between an open position and a closed position, the flip up portion forming a viewfinder for the camera when in the open position and configured to display information regarding an item visible within the viewfinder, wherein the at least one processor is configured to: (i) activate the camera when the flip up portion is in the open position and (ii) activate an image retrieval system that generates additional information related to an image captured by the camera when the flip up portion is in the open position.

17. The smart-watch of claim 16, wherein the flip up portion is at least partially transparent when in the open position to form the viewfinder.

18. The smart-watch of claim 16, wherein the information regarding the image is received from a computing device via the wireless transceiver.

19. The smart-watch of claim 16, wherein the flip up portion includes a top display exposed when the flip up portion is in the closed position, and an inside display opposite the top display, the inside display being concealed when the flip up portion is in the closed position and being exposed when the flip up portion is in the open position, the top display displaying a first set of information for viewing and the inside display displaying a second set of information for viewing different from the first set of information, the first set of information being considered acceptable for public viewing by a user.

* * * * *